United States Patent
Ward

(10) Patent No.: US 12,130,459 B2
(45) Date of Patent: Oct. 29, 2024

(54) SYSTEMS AND RELATED METHODS FOR COLLECTING LIGHT TRANSMITTED THROUGH AN ARCHITECTURAL OPENING

(71) Applicant: BATTELLE SAVANNAH RIVER ALLIANCE, LLC, Aiken, SC (US)

(72) Inventor: Patrick A. Ward, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 0 days.

(21) Appl. No.: 18/475,428

(22) Filed: Sep. 27, 2023

(65) Prior Publication Data

US 2024/0142689 A1     May 2, 2024

Related U.S. Application Data

(63) Continuation of application No. 17/979,377, filed on Nov. 2, 2022, now Pat. No. 11,988,860.

(51) Int. Cl.
*F21V 8/00* (2006.01)
*F21S 11/00* (2006.01)

(52) U.S. Cl.
CPC .......... *G02B 6/0006* (2013.01); *F21S 11/002* (2013.01); *G02B 6/0008* (2013.01)

(58) Field of Classification Search
CPC ..... G02B 6/0006; G02B 6/0008; F21S 11/002
See application file for complete search history.

(56) References Cited

U.S. PATENT DOCUMENTS

| | | | |
|---|---|---|---|
| 8,710,353 B2 | 4/2014 | Shepard | |
| 10,993,768 B2 | 5/2021 | Griffin et al. | |
| 2003/0110930 A1* | 6/2003 | Koizumi | D04C 1/02 87/9 |
| 2010/0177405 A1* | 7/2010 | Patterson | G02B 3/0056 359/793 |
| 2010/0224248 A1 | 9/2010 | Kenney et al. | |
| 2013/0077339 A1 | 3/2013 | Moyer | |
| 2013/0088888 A1 | 4/2013 | Fewkes et al. | |
| 2015/0125113 A1 | 5/2015 | Schreiber et al. | |
| 2015/0138823 A1* | 5/2015 | Corrigan | G02B 6/0003 356/218 |
| 2019/0076036 A1* | 3/2019 | Lasarov | G02B 6/08 |
| 2021/0367091 A1 | 11/2021 | Rotschild et al. | |

FOREIGN PATENT DOCUMENTS

WO   WO 2021/129962 A1   7/2021

OTHER PUBLICATIONS

Abuseda et al., "Solar-Thermal Production of Graphitic Carbon and Hydrogen via Methane Decomposition", Energy Fuels, vol. 36, 2022, pp. 3920-3928.

(Continued)

*Primary Examiner* — Donald L Raleigh
(74) *Attorney, Agent, or Firm* — Dority & Manning, P.A.

(57) ABSTRACT

In one aspect, a system for collecting light directed through an architectural opening includes a plurality of optical fibers positioned within the architectural opening. A portion of light from a light source is absorbed by the plurality of optical fibers. One or more optical fibers of the plurality of optical fibers are configured to transmit the absorbed light to one or more light collection elements.

13 Claims, 4 Drawing Sheets

(56) References Cited

OTHER PUBLICATIONS

Aslian et al., "Rectangular Glass Optical Fiber for Transmitting Sunlight in a Hybrid Concentrator Photovoltaic and Daylight System", Hindawi, International Journal of Photoenergy, vol. 2020, Article ID 8813688, 2020 15 pages.
Flood et al., "Large area stimulated emission luminescent solar concentrators modelled using detailed balance consistent rate equations", Optics Express, vol. 30, No. 11, May 23, 2022, 17 pages.
Kallweit et al., "An Overview on Methods for Producing Side-Emitting Polymer Optical Fibers", Textiles, vol. 1, 2021, pp. 337-360.
Karp et al . . . "Radial Coupling Method for Orthogonal Concentration within Planar Micro-Optic Solar Collectors", Optical Society of America, 2010, 3 pages.
Kribus et al., "Optical Fibers and Solar Power Generation", Solar Energy, vol. 68, No. 5, 2000, pp. 405-416.
Lanzarini-Lopes, Mariana, "Visible and Ultraviolet Light Side-Emitting Optical Fibers Enable Water Purification", a Dissertation, Arizona State University, May 2020, 209 pages.
Logunov et al., Light diffusing optical fiber for Illumination, Renewable Energy and the Environment Congress, 2013, 3 pages.
Nithyanandam et al., "Analysis and design of a radial waveguide concentrator for concentrated solar thermal applications", Energy, vol. 151, 2018, pp. 940-953.
Obradovic et al., "Daylight Transport Systems for Buildings at High Latitudes", Journal of Daylighting, vol. 6, 2019, pp. 60-79.

\* cited by examiner

SYSTEMS AND RELATED METHODS FOR COLLECTING LIGHT TRANSMITTED THROUGH AN ARCHITECTURAL OPENING

RELATED APPLICATIONS

The present application is a continuation application and claims priority to U.S. patent application Ser. No. 17/979,377, having a filing date of Nov. 2, 2022, which is incorporated herein by reference in its entirety.

FEDERAL RESEARCH STATEMENT

This invention was made with government support under Contract No. 89303321CEM000080 awarded by the U.S. Department of Energy. The government has certain rights in the invention.

FIELD

This present subject matter relates generally to harvesting solar energy and, more particularly, to systems and related methods for collecting light transmitted through an architectural opening, such as a window.

BACKGROUND

Due to increasing pollution and the limited availability of non-renewable resources, the utilization of renewable resources has become more commonplace. Indeed, solar energy is one such renewable resource frequently utilized in modern times. Traditionally, only power sectors and governments have utilized solar panels or photovoltaic modules to harvest solar energy. However, the increase in energy demand and limited area available for installing solar panels or photovoltaic modules has resulted in companies, households, and other similar infrastructures installing solar panels or photovoltaic modules on their private building structures. For instance, solar panels or photovoltaic modules are generally deployed in a wide variety of ways, including deployment over the roofs, sheds, and balconies of buildings.

Generally, the incorporation of solar panels or photovoltaic modules into architectural openings, such as windows, has yet to be substantially developed. Notably, solar panels or photovoltaic modules incorporated into architectural openings may have limited efficiency due to the limited contact of light with the solar panels or photovoltaic modules installed in the respective architectural opening. Thus, there is a need for an improved system and related method for collecting light transmitted through an architectural opening.

SUMMARY OF THE INVENTION

Aspects and advantages of the invention will be set forth in part in the following description, or may be obvious from the description, or may be learned through practice of the invention.

In one aspect, the present subject matter is directed to a system for collecting light transmitted through an architectural opening. The system may include: an architectural opening through which light is configured to be directed; a plurality of optical fibers positioned within the architectural opening; and at least one light collection element positioned relative to the plurality of optical fibers. Additionally, the system may include that at least one optical fiber of the plurality of optical fibers redirects and transmits a portion of the light directed through the architectural opening to at least one light collection element.

In one aspect, the present subject matter is directed to a kit for collecting light transmitted through an architectural opening. The kit may include: a plurality of optical fibers configured to be positioned within an architectural opening, each optical fiber of the plurality of optical fibers configured to absorb light radially from a light source and transmit the absorbed light axially along a length of the optical fiber to at least one of a first end portion and a second end portion; and at least one light collection element configured to receive the light transmitted from at least one of the first end portion and the second end portion of at least one optical fiber of the plurality of optical fibers.

In one aspect, the present subject matter is directed to a method for collecting light transmitted through an architectural opening. The method may include: absorbing at least a portion of the light transmitted through the architectural opening with a plurality of optical fibers positioned within the architectural opening; transmitting the absorbed light through at least one optical fiber of the plurality of optical fibers to at least one light collection element; and converting the absorbed light transmitted to the at least one light collection element into electricity for storage within an energy storage device.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
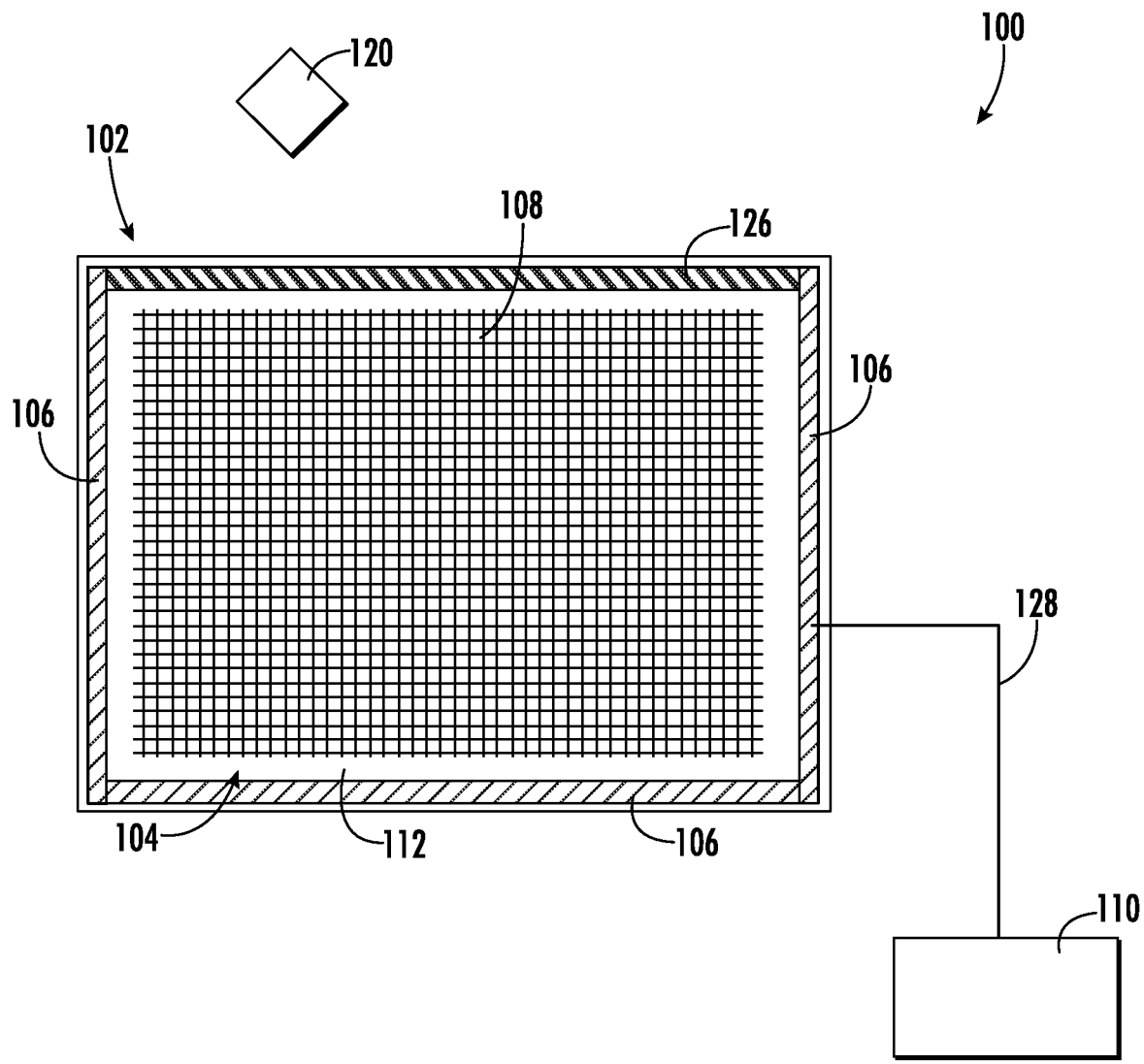
FIG. 1 illustrates a schematic view of one embodiment of a system for collecting light transmitted through an architectural opening in accordance with aspects of the present subject matter.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to systems and related methods for collecting light directed through an architectural opening. The system for collecting light directed through an architectural opening may include one or more light collection elements and a plurality of optical fibers. The light collection system of the present disclosure may have enhanced efficiency compared to traditional light collection systems. For instance, the light collection system of the present disclosure may be able to enhance the amount of light from a light source (e.g., the sun) that is converted into electricity as compared to traditional light collection systems. Notably, the light collection system of the present disclosure may be retrofitted into existing structures. For instance, the light collection system of the present disclosure may be retrofitted to an existing architectural opening, such as a window.

Referring now to the drawings, FIG. 1 illustrates a schematic view of one embodiment of a light collection system 100 for collecting light directed through an architectural opening 102 in accordance with aspects of the present subject matter.

As illustrated in FIG. 1, the light collection system 100 may include one or more light collection elements 106 and a plurality of optical fibers 108 positioned within and/or relative to the architectural opening 102. As will be described below, the optical fibers 108 may be configured to collect or capture light (e.g., sunlight) transmitted into or through the architectural opening 102 from a light source (e.g., the sun) and transmit such collected light along the length of each optical fiber of the plurality of optical fibers 108 to one or more light collection elements 106. The one or more light collection elements 106 may then be configured to convert light into electricity for storage within an energy storage device 110.

In one embodiment, the one or more light collection elements may include one or more photovoltaic elements. For instance, the one or more light collection elements 106 may be able to convert light having a wavelength from about 5 nm to about 2000 nm into electricity, such as a wavelength of about 5 nm or more, such as about 100 nm or more, such as about 200 nm or more, such as about 300 nm or more, such as about 400 nm or more, such as about 500 nm or more, such as about 600 nm or more, such as about 700 nm or more, such as about 800 nm or more, such as about 900 nm or more, such as about 1000 nm or more, such as about 2000 nm or less, such as about 1500 nm or less, such as about 1000 nm or less, such as about 900 nm or less, such as about 800 nm or less, such as about 700 nm or less, such as about 600 nm or less, such as about 500 nm or less, such as about 400 nm or less.

In one aspect, one or more light collection elements 106 may comprise one or more semiconducting materials. For instance, one or more light collection elements 106 may comprise silicon (e.g., crystalline silicon), perovskite, organic compounds, or a combination thereof. Further, for instance, one or more light collection elements 106 may comprise cadmium telluride, copper indium diselenide, copper indium gallium diselenide, or a combination thereof. In some aspects, one or more light collection elements of the one or more light collection elements 106 may be dye-sensitized photovoltaic elements, quantum-dot photovoltaic elements, thin-film photovoltaic elements, or a combination thereof.

The number of light collection elements 106 utilized in the light collection system 100 is not necessarily limited by the present disclosure. For instance, the number of light collection elements 106 utilized in the light collection system 100 may be 1 or more, such as 2 or more, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more, such as 100 or more. The number of light collection elements 106 may vary, for example, depend on the number and/or orientation of the optical fibers 108 utilized within the light collection system 100.

The one or more light collection elements 106 may be of any shape and size. For instance, in one aspect, one or more light collection elements of the one or more light collection elements 106 may be circular, rectangular, or triangular. The plurality of optical fibers 108 may have one or more optical fibers having the same length. Additionally or alternatively, the plurality of optical fibers 108 may have one or more optical fibers having different lengths.

In one aspect, one or more light collection elements 106 may be positioned relative to the plurality of optical fibers 108. For instance, as illustrated in FIG. 1, one or more light collection elements 106 may be positioned along the perimeter of the architectural opening 102. For instance, one or more light collection elements 106 may be positioned on the outermost portion of the architectural opening 102, such as along the inner sides or surfaces of the frame (e.g., a window frame) surrounding the opening 102. Generally, one or more light collection elements 106 may be positioned along any portion or section of the perimeter of the architectural opening 102. For instance, as illustrated in FIG. 1, one or more light collection elements 106 may be positioned on a vertical section of the perimeter of the architectural opening 102. In another aspect, one or more light collection elements 106 may be positioned on a horizontal section of the perimeter of the architectural opening 102. In a further aspect, one or more light collection elements 106 may be positioned on a first section and a second section of the perimeter of the architectural opening. For instance, one or more light collection elements 106 may be positioned on a vertical section and a horizontal section of the perimeter of the architectural opening 102. In another further aspect, one or more light collection elements 106 may be positioned on the entirety of the perimeter of the architectural opening 102.

As illustrated in FIG. 1, one or more light collection elements 106 may be in electric communication (e.g., via one or more electrical lines or couplings 128) with an energy storage device 110. In this respect, the one or more light collection elements 106 may transmit energy to the energy storage device 110. The energy storage device 110 is generally any device that can store energy. For instance, the energy storage device 110 may include a battery, a supercapacitor, an ultracapacitor, or a combination thereof. When the energy storage device 110 is a battery, the energy storage device 110 may be configured as a lithium-ion battery module having any suitable number of batteries or cells. However, in alternative aspects, the energy storage device 110 may be configured as a nickel metal hydride battery module(s), a lead acid battery module(s), and/or the like.

Figure 2:
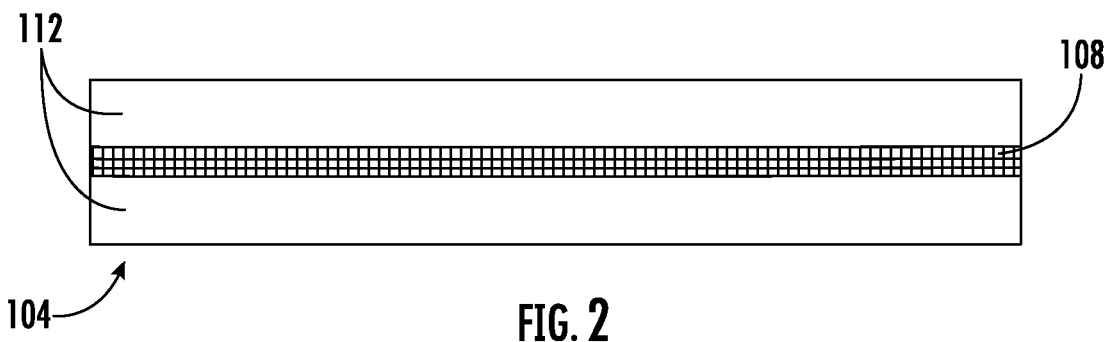
FIG. 2 illustrates a side view of one embodiment of a system for collecting light transmitted through an architectural opening in accordance with aspects of the present subject matter.
Figure 3:
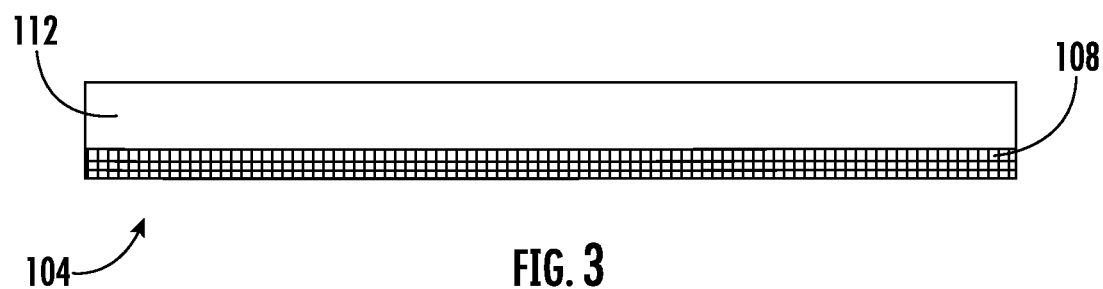
FIG. 3 illustrates a side view of one embodiment of a system for collecting light transmitted through an architectural opening in accordance with aspects of the present subject matter.

In one aspect, the architectural opening 102 may include a glass structure 104. The glass structure 104 may include one or more glass panes 112. In this respect, the glass structure 104 may be in the form of a window. As illustrated in FIG. 2 and FIG. 3, the plurality of optical fibers 108 may be adjacent to one or more glass panes 112. For instance, as illustrated in FIG. 2, the plurality of optical fibers 108 may be between two or more glass panes 112. In another aspect, as illustrated in FIG. 3, the plurality of optical fibers 108 may be adjacent to only one glass pane 112, such as by being positioned in front of or behind the glass pane 112. In this respect, the plurality of optical fibers 108 may be retrofitted or installed adjacent to a glass pane 112 of a window. In one aspect, the plurality of optical fibers 108 may be adhered to one or more glass panes 112 by an adhesive. In another aspect, the plurality of optical fibers may be anchored to the perimeter of the architectural opening 102. The plurality of optical fibers 108 may be incorporated into a glass structure 104 in the process of forming a glass structure 104. For instance, the plurality of optical fibers 108 may be affixed to one or more glass panes 112 during the process of forming the glass structure 104.

The plurality of optical fibers 108 includes individual optical fibers. One or more of the optical fibers of the plurality of optical fibers 108 may be cylindrical in shape. One or more optical fibers of the plurality of optical fibers 108 may be a multi-mode optical fiber or a single-mode optical fiber. In one aspect, one or more optical fibers of the plurality of optical fibers 108 may be rigid. In another aspect, one or more optical fibers of the plurality of optical fibers 108 may be flexible. Generally, the optical fibers of the plurality of optical fibers 108 can have any suitable length. For use in an architectural opening 102, one or more optical fibers of the plurality of optical fibers 108 may have a length from about 15 centimeters to about 100 meters, such as about 15 centimeters or more, such as about 50 centimeters or more, such as about 1 meter or more, such as about 5 meters or more, such as about 20 meters or more, such as about 50 meters or more, such as about 100 meters or less, such as about 50 meters or less, such as about 20 meters or less, such as about 5 meters or less, such as about 1 meter or less, such as about 50 centimeters or less. In some aspects, one or more optical fibers of the plurality of optical fibers 108 may have a length less than about 15 centimeters or a length greater than about 100 meters.

In some aspects, the plurality of optical fibers 108 may include one or more optical fibers that are Fibrance® light diffusing fibers manufactured by Corning Inc.

Figure 4:
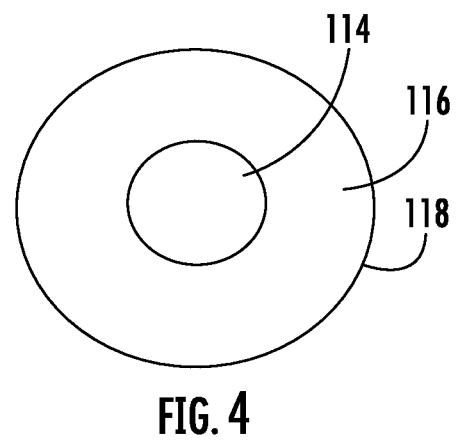
FIG. 4 illustrates a cross-sectional view of an optical fiber in accordance with aspects of the present subject matter.

As illustrated in FIG. 4, the individual optical fibers of the plurality of optical fibers 108 may comprise a core 114, a cladding 116, and/or a coating 118. The core 114, the cladding 116, and/or the coating 118 may be transparent or translucent. For instance, the core 114, the cladding 116, and/or the coating 118 may be formed from transparent or translucent materials. Utilizing transparent materials in forming the core 114, the cladding 116, and/or the coating 118 may be particularly beneficial when the plurality of optical fibers 108 is incorporated into an architectural opening 102 comprising one or more glass panes 112.

The core 114 may include one or more core sections, the one or more core sections forming concentric circles or nonconcentric circles. The one or more core sections of the core 114 may be comprised of the same materials or different materials. For instance, two or more core sections may be comprised of the same material while one or more other core sections are comprised of different materials.

The core 114 and/or cladding 116 may comprise silica glass, a plastic material, or a combination thereof. In one aspect, the silica glass of the core 114 and/or cladding 116 may be doped with aluminum oxide or germanium oxide to raise the refractive index. In another aspect, the silica glass of the core 114 and/or cladding 116 may be doped with boron trioxide or fluorine to lower the refractive index. The plastic material of the core 114 and/or cladding 116 may be a polymer. For instance, the plastic material may be a fluorinated polymer, a silicone-based polymer, an acrylate-based polymer, or a combination thereof.

In one aspect, the core 114 may have a diameter from about 5 microns to about 3 mm. For instance, the core 114 may have a diameter of about 5 microns or more, such as about 10 microns or more, such as about 25 microns or more, such as about 50 microns or more, such as about 75 microns or more, such as about 100 microns or more, such as about 150 microns or more, such as about 200 microns or more, such as about 250 microns or more, such as about 500 microns or more. The core 114 may have a diameter of about 3 mm or less, such as about 2 mm or less, such as about 1 mm or less, such as about 500 microns or less, such as about 250 microns or less, such as about 200 microns or less, such as about 150 microns or less, such as about 100 microns or less, such as about 75 microns or less, such as about 50 microns or less, such as about 25 microns or less.

In one aspect, the cladding 116 may have a thickness from about 5 microns to about 2 mm, such as about 5 microns or more, such as about 10 microns or more, such as about 25 microns or more, such as about 50 microns or more, such as about 75 microns or more, such as about 100 microns or more, such as about 125 microns or more, such as about 150 microns or more, such as about 500 microns or more, such as about 1 mm or more. The cladding 116 may have a thickness of about 2 mm or less, such as about 1 mm or less, such as about 500 microns or less, such as about 150 microns or less, such as about 125 microns or less, such as about 100 microns or less, such as about 75 microns or less, such as about 50 microns or less, such as about 25 microns or less.

The coating 118 may be single-layer coating or a multi-layer coating. Generally, the coating 118 may include a glass coating, a polymeric coating, or a combination thereof. In one aspect, the coating 118 may be a silicone coating, an acrylate coating, a polyimide coating, a carbon coating, a polypropylene coating, a polyethylene coating, a polyurethane coating, or a combination thereof. In one aspect, the coating 118 may change the wavelength of the light absorbed by the plurality of optical fibers 108. In this respect, the coating 118 may alter the wavelength of the light absorbed from a light source 120 such that the light transmitted by one or more optical fibers of the plurality of optical fibers 108 to one or more light collection elements 106 is a different wavelength from light transmitted from the light source 120 to the plurality of optical fibers 108.

In one aspect, the coating 118 may have a thickness from about 1 micron to about 1.5 mm, such as about 1 micron or more, such as about 5 microns or more, such as about 10 microns or more, such as about 25 microns or more, such as about 50 microns or more, such as about 75 microns or more, such as about 100 microns or more, such as about 125 microns or more, such as about 150 microns or more, such as about 250 microns or more, such as about 500 microns or more. The coating 118 may have a thickness of about 1.5 mm or less, such as about 1 mm or less, such as about 500 microns or less, such as about 250 microns or less, such as about 150 microns or less, such as about 125 microns or less, such as about 100 microns or less, such as about 75 microns or less, such as about 50 microns or less, such as about 25 microns or less, such as about 10 microns or less.

Figure 5:
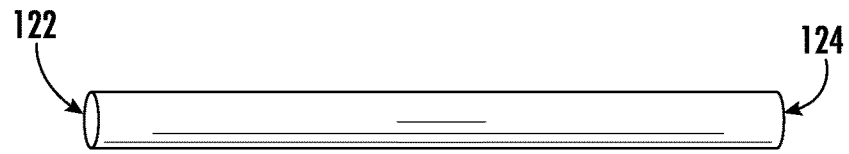
FIG. 5 illustrates a perspective view of an optical fiber in accordance with aspects of the present subject matter.

Generally, each optical fiber of the plurality of optical fibers 108 may absorb a portion of light from a light source 120 (e.g., the Sun). In this respect, the plurality of optical fibers 108 may absorb a portion of light transmitted from a light source 120 through an architectural opening 102. In one aspect, each optical fiber of the plurality of optical fibers 108 may absorb light from a light source 120 radially, axially, or a combination thereof. As used herein, absorbing light 'radially' refers to absorbing light in the radial direction. The radial direction corresponds to a direction extending from the center axis of an optical fiber to the circumference of the optical fiber. As used herein, absorbing light 'axially' refers to absorbing light in the axial direction. The axial direction corresponds to the center axis of an optical fiber and extends along the length of the optical fiber. In this respect, an optical fiber may absorb light axially from a light source 120 through a first end portion 122 and/or a second end portion 124 of the optical fiber. The first end portion 122 and the second end portion 124 are illustrated in FIG. 5.

In general, each optical fiber of the plurality of optical fibers 108 can redirect and transmit the absorbed light from the light source 120 to one or more light collection elements 106. For instance, a portion of light from a light source 120 directed through an architectural opening 102 may be redirected and transmitted to at least one light collection element of the one or more light collection elements 106 by one or more optical fibers of the plurality of optical fibers 108.

In one aspect, as illustrated in FIG. 1, the plurality of optical fibers 108 may be configured such that a portion of light from a light source 120 is absorbed radially by one or more optical fibers of the plurality of optical fibers 108. The radially absorbed light may be transmitted axially along a length of one or more optical fibers of the plurality of optical fibers 108 to at least one of a first end portion 122 or a second end portion 124 of each optical fiber that has absorbed light from the light source 120. The first end portion 122 and/or second end portion 124 of one or more optical fibers of the plurality of optical fibers 108 may be orientationally positioned such that the absorbed light may be further transmitted or directed by the first end portion 122 or second end portion 124 of one or more optical fibers of the plurality of optical fibers 108 to one or more light collection elements 106. For instance, as illustrated in FIG. 1, one of the respective end portions of multiple optical fibers of the plurality of optical fibers 108 are orientationally positioned to direct light from the respective optical fiber to one or more light collection elements 106. In this respect, one or more light collection elements of the one or more light collections elements 106 may be configured to receive the light transmitted from at least one of a first end portion 122 and the second end portion 124 of at least one optical fiber of the plurality of optical fibers 108.

Generally, the respective end portions of one or more optical fibers of the plurality of optical fibers 108 may be directed to or face any section or side of the perimeter of the architectural opening 102. In this respect, each optical fiber of the plurality of optical fibers 108 can redirect and transmit light from a light source 120 to one or more light collection elements 106 positioned on any section or side of the perimeter of the architectural opening 102.

In another aspect, when the plurality of optical fibers 108 is configured such that light from a light source 120 is absorbed radially by one or more optical fibers of the plurality of optical fibers 108, one or more optical fibers of the plurality of optical fibers 108 may redirect and transmit a portion of the absorbed light radially. For instance, as the absorbed light is transmitted down the length of one or more optical fibers of the plurality of optical fibers 108, a portion of the absorbed light may be directed or transmitted radially. In this respect, a portion of the light radially absorbed by one or more optical fibers of the plurality of optical fibers 108 from a light source 120 may be redirected and transmitted radially to one or more light collection elements 106.

In another aspect, the plurality of optical fibers 108 is configured such that light from a light source 120 is absorbed axially by one or more optical fibers of the plurality of optical fibers 108, the axially absorbed light absorbed through a first end portion 122 and/or a second end portion 124 of one or more optical fibers of the plurality of optical fibers 108. The axially absorbed light may be transmitted axially along a length of one or more optical fibers of the plurality of optical fibers 108 to at least one of a first end portion 122 or a second end portion 124 of one or more optical fibers of the plurality of optical fibers 108. As illustrated in FIG. 1, the first end portion 122 and/or second end portion 124 of the one or more optical fibers of the plurality of optical fibers 108 may be orientationally positioned such that the absorbed light may be transmitted or directed by at least one of the first end portion 122 or second end portion 124 of one or more optical fibers of the plurality of optical fibers 108 to one or more light collection elements 106. In one aspect, a portion of the axially absorbed light may be transmitted radially by one or more optical fibers of the plurality of optical fibers 108. In this respect, a portion of the light axially absorbed by one more optical fibers of the plurality of optical fibers 108 from a light source 120 may be redirected and transmitted radially to one or more light collection elements 106.

The absorbed light (e.g., visible light) transmitted by the individual optical fibers of the plurality of optical fibers 108 may have a wavelength from about 5 nm to about 2000 nm, such as a wavelength of about 5 nm or more, such as about 100 nm or more, such as about 200 nm or more, such as about 300 nm or more, such as about 400 nm or more, such as about 500 nm or more, such as about 600 nm or more, such as about 700 nm or more, such as about 800 nm or more, such as about 900 nm or more, such as about 1000 nm or more, such as about 2000 nm or less, such as about 1500 nm or less, such as about 1000 nm or less, such as about 900 nm or less, such as about 800 nm or less, such as about 700 nm or less, such as about 600 nm or less, such as about 500 nm or less, such as about 400 nm or less. In this respect, one or more optical fibers of the plurality of optical fibers 108 may transmit a portion of light having a wavelength from about 5 nm to about 2000 nm to one or more light collection elements 106.

In one aspect, the plurality of optical fibers 108 may reduce the amount of light from a light source 120 entering an existing structure. For instance, the plurality of optical fibers 108 may reduce the amount of light from a light source 120 entering a room through an architectural opening 102, such as a window A reduced amount of light entering the room may be advantageous. For instance, a reduced amount of light entering a room may lower the cooling costs associated with keeping the room at a suitable temperature. In this respect, the plurality of optical fibers 108 may increase the energy efficiency of a building or structure.

The plurality of optical fibers 108 may be in the form of a fibrous mesh. The fibrous mesh may include one or more sets of optical fibers. For instance, the fibrous mesh may include a first set of optical fibers, a second set of optical fibers, a third set of optical fibers, and a fourth set of optical fibers. The respective sets of optical fibers may have the same or different orientation to one or more other respective sets of optical fibers. The respective sets of optical fibers may be layered such that one set of optical fibers is adjacent one or more other, different sets of optical fibers. Generally, each optical fiber of the respective sets of optical fibers is substantially linear. For instance, as illustrated in FIG. 1, one or more optical fibers of the plurality of optical fibers 108 may be linear. Alternatively or additionally, one or more fibers of the plurality of optical fibers 108 may include one or more optical fibers having a non-linear or meandered (e.g., L-shaped, sinuous) configuration.

In one aspect, the fibrous mesh may be a linear fibrous mesh. For instance, the optical fibers of a first set of optical fibers may be linear and the optical fibers of a second set of optical fibers may be linear. Generally, the linear fibrous mesh may be a linear mono-directional configuration of optical fibers, a linear bi-directional configuration of optical fibers, a linear tri-directional configuration of optical fibers, or a linear quad-directional configuration of optical fibers.

In one aspect, the fibrous mesh of the plurality of optical fibers 108 may be in a linear mono-directional configuration. For instance, the optical fibers of a first set of optical fibers may have their respective first end portions 122 facing a first side of the perimeter of the architectural opening 102 and their respective second end portions 124 facing a second, opposite side of the perimeter of the architectural opening 102.

Figure 7:
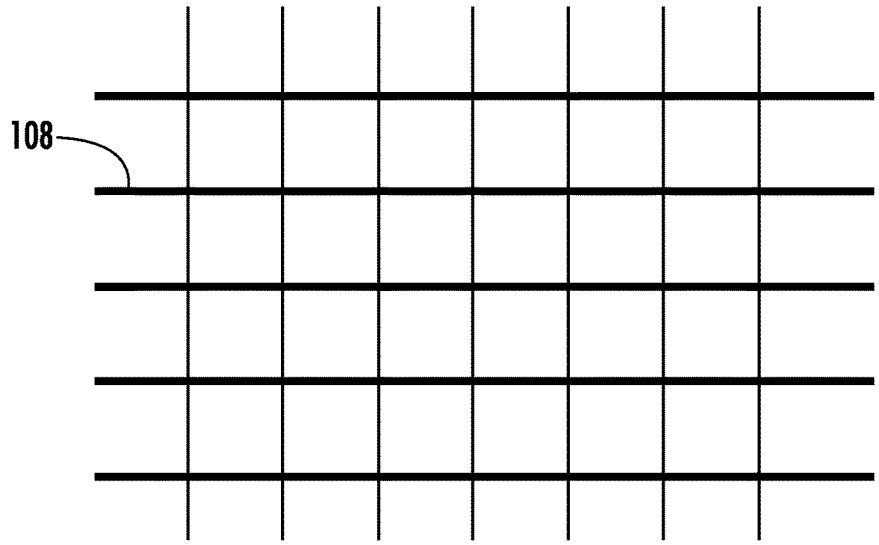
FIG. 7 illustrates a perspective view of one embodiment of a plurality of optical fibers in accordance with aspects of the present subject matter.

In another aspect, as previously disclosed, the fibrous mesh may be in a linear bi-directional configuration. In one aspect, the bi-directional fibrous mesh may have a first set of optical fibers and a second set of optical fibers that are perpendicular to one another. In this respect, as illustrated in FIG. 1 and FIG. 7, the optical fibers of a first set of optical fibers and the optical fibers of a second set of optical fibers may intersect at 90 degrees. It should be noted that the dark, horizontal lines of FIG. 7 are an illustrative representation of one set of optical fibers, whereas the light, vertical lines of FIG. 7 are an illustrative representation of another, different set of optical fibers. As further illustrated in FIG. 1, one or more optical fibers of the first set of optical fibers may have their respective first end portions 122 facing a first side of the perimeter of the architectural opening 102 and their respective second end portions 124 facing a second, opposite side of the perimeter of the architectural opening 102. As additionally illustrated in FIG. 1, one or more optical fibers of the second set of optical fibers may have their respective first end portions 122 facing a first side of the perimeter of the architectural opening 102 and their respective second end portions 124 facing a second, opposite side of the perimeter of the architectural opening 102.

In one aspect, as illustrated in FIG. 1, a first set of optical fibers may be vertically oriented optical fibers and a second set of optical fibers may be horizontally oriented optical fibers. In another aspect, a first set of optical fibers may be horizontally oriented optical fibers and a second set of optical fibers may be horizontally oriented optical fibers, the two horizontal axes perpendicular to one another. With respect to the vertically oriented optical fibers and the horizontally oriented optical fibers, the determination of the relevant axis to which the optical fibers are oriented is based on the configuration of the architectural opening 102. For instance, a window extending vertically may have a fibrous mesh having a first set of optical fibers that are vertically oriented optical fibers and a second set of optical fibers that are horizontally oriented optical fibers. Alternatively, a window extending horizontally (e.g., a skylight), may have a fibrous mesh having a first set of optical fibers that are horizontally oriented optical fibers and a second set of optical fibers that are also horizontally oriented optical fibers.

In one aspect, the fibrous mesh may be a linear tri-directional fibrous mesh having a first set of optical fibers, a second set of optical fibers, and a third set of optical fibers that intersect at angles less and greater than 90 degrees. In another aspect, the fibrous mesh may be a linear quad-directional fibrous mesh. The quad-directional fibrous mesh may include two or more linear bi-directional fibrous meshes bonded perpendicular to one another.

Figure 6:
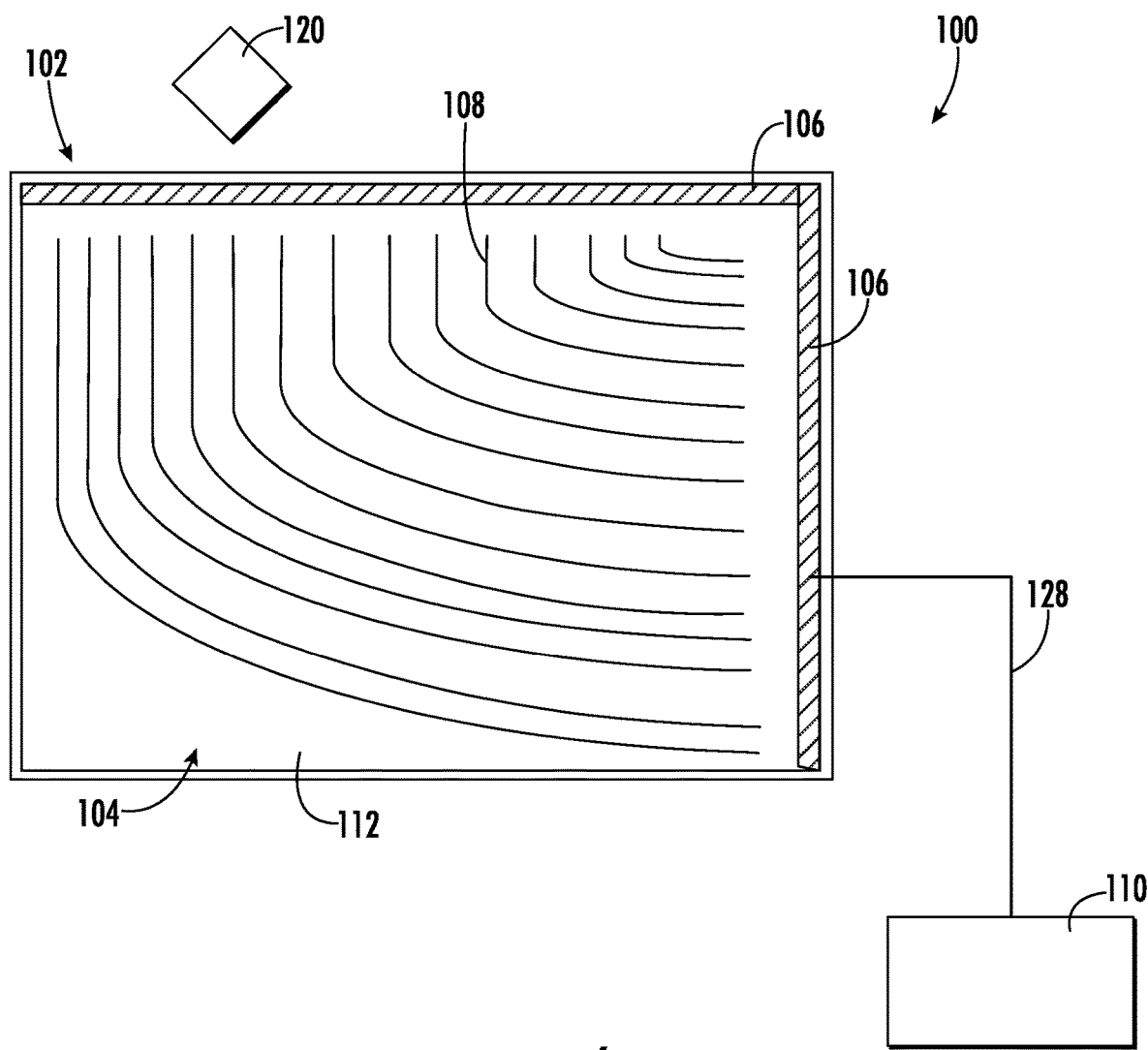
FIG. 6 illustrates a schematic view of one embodiment of a system for collecting light transmitted through an architectural opening in accordance with aspects of the present subject matter.

In one aspect, the fibrous mesh may include one or more optical fibers that are non-linear. For instance, as previously disclosed, one or more sets of optical fibers of the fibrous mesh of the plurality of optical fibers 108 may comprise optical fibers that are L-shaped. As illustrated in FIG. 6, the fibrous mesh may include a fibrous mesh comprising a first set of optical fibers oriented to have their respective first end portions 122 facing a first side of the perimeter of the architectural opening 102 and their respective second end portions 124 facing a second, different side of the perimeter of the architectural opening 102, the first side of the perimeter and the second side of the perimeter on non-opposing sides of the perimeter. As illustrated in FIG. 6, the side of the perimeter to which the respective first end portions 122 of the first set of optical fibers are facing may abut the side of the perimeter to which the respective second end portions 124 of the second set of optical fibers are facing. In another aspect, the side of the perimeter to which the respective first end portions 122 of the first set of optical fibers are facing may not abut the side of the perimeter to which the respective second end portions 124 of the second set of optical fibers are facing.

In some aspects, the plurality of optical fibers 108 may be in the form of a woven fibrous mesh or a nonwoven fibrous mesh. For instance, the plurality of optical fibers 108 may form a woven fibrous mesh with a selectively chosen number of interlaces. The woven fibrous mesh may provide enhanced strength to the substrate to which it is adjacent. For instance, the woven fibrous mesh may provide enhanced strength to one or more glass panes 112. In another aspect, the one or more optical fibers may be in the form of a nonwoven fibrous mesh. For instance, a first set of optical fibers may be bonded to a second set of optical fibers to form the plurality of optical fibers 108. The sets of optical fibers may be bonded by mechanical bonding, chemical bonding, thermal bonding, or a combination thereof to form a non-woven fibrous mesh.

Various spacing between each individual optical fiber of the plurality of optical fibers 108 may be utilized. In one aspect, the spacing between one or more optical fibers of the plurality of optical fibers 108 may be uniform. For instance, the space between one optical fiber and another, different optical fiber may be constant over the length of each of the optical fibers. Alternatively, in another aspect, the space between one optical fiber and another, different optical fiber may be intermittently constant. In this respect, the space between one optical fiber and another, different optical fiber may vary over the length of each respective optical fiber. The spacing between each optical fiber may refer to the spacing between fibers on the same plane, such as a horizontal plane, a vertical plane, or a diagonal plane. Alternatively, the spacing between each optical fiber may refer to the spacing between one optical fiber and another, different optical fiber on different planes.

In one aspect, the spacing between each individual optical fiber of the plurality of optical fibers 108 may be minimized.

For instance, there may be no space between one optical fiber and another, different optical fiber. In this respect, one or more optical fibers of the plurality of optical fibers 108 may be contacting one or more other optical fibers of the plurality of optical fibers 108. In one aspect, the contact between the one or more optical fibers may be constant along the entire length of the respective optical fiber. In another aspect, the contact may be intermittently constant such that the one or more optical fibers contact each other at varying segments along the length of each respective optical fiber.

In one aspect, each optical fiber of the plurality of optical fibers 108 may be spaced from a neighboring optical fiber by about 1 nanometer to about 0.5 meters, such as about 1 nanometer or more, such as about 1 micron or more, such as about 1 millimeter or more, such as about 1 centimeter or more, such as about 1 decimeter or more, such as about 0.2 meters or more, such as about 0.3 meters or more, such as about 0.4 meters or more, such as about 0.5 meters or less, such as about 0.4 meters or less, such as about 0.3 meters or less, such as about 0.2 meters or less, such as about 1 decimeter or less, such as about 1 centimeter or less, such as about 1 millimeter or less, such as about 1 micron or less. A 'neighboring' optical fiber refers to the closest optical fiber relative to the reference optical fiber at any point along the length of the reference optical fiber. In this respect, an optical fiber may have a single neighboring optical fiber or multiple neighboring optical fibers.

As illustrated in FIG. 1, the light collection system 100 of the present disclosure may include one or more optical elements 126. Generally, the one or more optical elements 126 may be of any size or shape. For instance, one or more optical elements of the one or more optical elements 126 may be planar or parabolic (e.g., concave, convex). One or more optical elements of the one or more optical elements 126 may include two-dimensional optical elements, three-dimensional optical elements, or a combination thereof. In some aspects, one or more optical elements of the one or more optical elements 126 may be reflective elements. In this respect, one or more optical elements of the one or more optical elements 126 may reflect light to the one or more light collection elements 106. In some aspects, one or more optical elements of the one or more optical elements 126 may be solar mirrors. In some aspects, one or more optical elements of the one or more optical elements 126 may redirect light to the one or more light collection elements 106.

In general, one or more optical elements 126 may include a glass substrate, a metal substrate, or a combination thereof. As used in this paragraph with respect to the one or more optical elements 126, the 'substrate' refers to the segment of an optical element 126 to which a reflective layer or optical layer is affixed. The reflective layer or optical layer may be configured to reflect light or redirect light from the light source 120 to one or more optical fibers of the plurality of optical fibers 108, to one or more light collection elements 106, or a combination thereof. The one or more optical elements 126 may comprise a metal film (e.g., aluminum, silver), a polymer (e.g., biaxially-oriented polyethylene terephthalate), or a combination thereof.

As previously disclosed herein, the light collection system 100 of the present disclosure may be retrofitted to existing structures. For instance, the light collection system 100 may be in the form of a kit, the kit configured to be installed on an existing glass structure 104. The kit may include any of the light collection system 100 components disclosed herein. For instance, the kit may include a plurality of optical fibers 108, one or more light collection elements 106 (e.g., photovoltaic element), one or more optical elements 126, an energy storage device 110, or a combination thereof. Notably, retrofitting the architectural opening(s) 102 of existing structures utilizing the plurality of optical fibers 108 may involve minimal modification or no modification of the existing architectural opening(s) 102.

Figure 8:
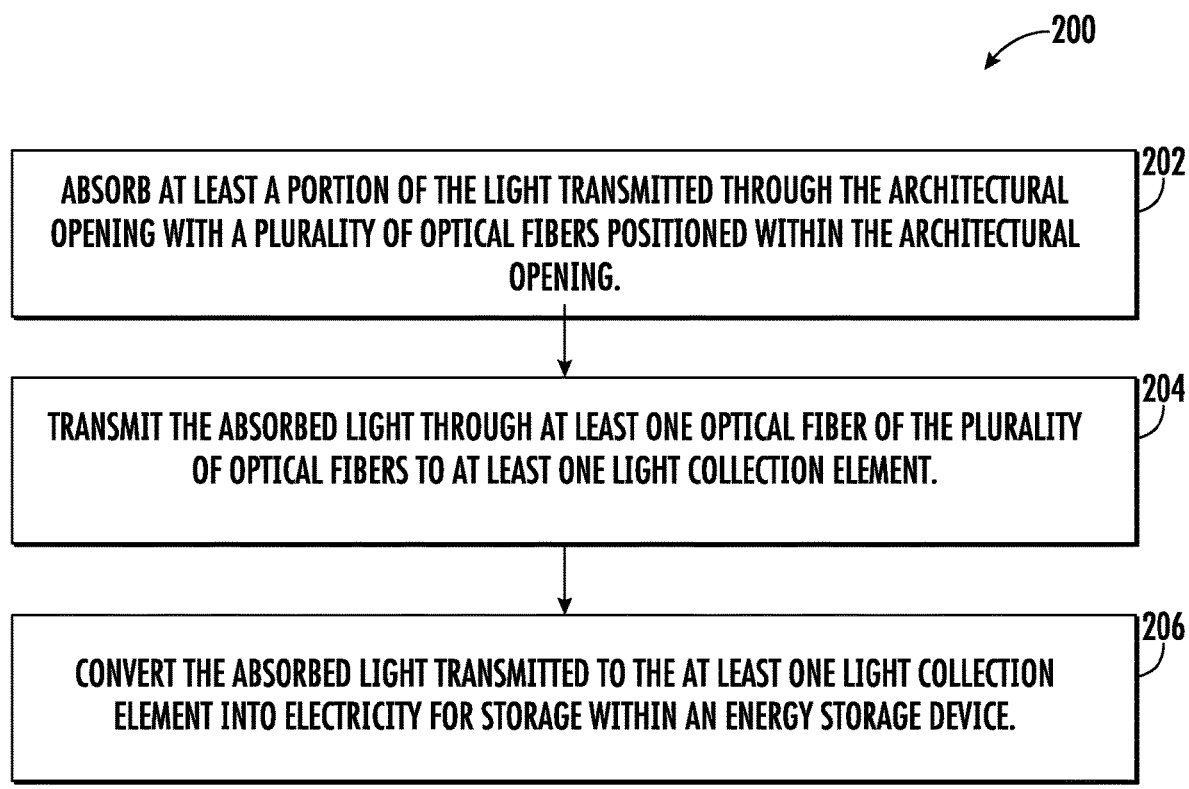
FIG. 8 illustrates a flow diagram of one embodiment of a method for collecting light transmitted through an architectural opening in accordance with aspects of the present subject matter.

Referring now to FIG. 8, a flow diagram of one embodiment of a method 200 for collecting light transmitted through an architectural opening 102 is illustrated in accordance with aspects of the present subject matter. As illustrated in FIG. 8, at 202, the method 200 may include absorbing at least a portion of the light transmitted through the architectural opening 102 with a plurality of optical fibers 108 positioned within the architectural opening 102. In some aspects, each optical fiber of the plurality of optical fibers 108 may absorb the light radially from a light source 120.

Additionally, at 204, the method 200 may include transmitting the absorbed light through at least one optical fiber of the plurality of optical fibers 108 to at least one light collection element of the one or more light collection elements 106. In some aspects, the absorbed light may be transmitted axially along a length of the at least one optical fiber of the plurality of optical fibers 108 to at least one light collection element of the one or more light collection elements 106.

Moreover, at 206, the method 200 may include converting the absorbed light transmitted to the at least one light collection element of the one or more light collection elements 106 into electricity for storage within an energy storage device 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

The invention claimed is:

1. A system comprising:
   a glass structure through which light is configured to pass; and
   a plurality of optical fibers supported relative to the glass structure, the plurality of optical fibers being in the form of a fibrous mesh, the plurality of optical fibers configured to absorb and redirect light, wherein at least one optical fiber of the plurality of optical fibers comprises a first end portion and a second end portion; the at least one optical fiber of the plurality of optical fibers being configured to absorb light radially and the at least one optical fiber of the plurality of optical fibers being cylindrical.

2. The system of claim 1, wherein the fibrous mesh comprises a first set of optical fibers and a second set of optical fibers, the first set of optical fibers having an orientation different than the orientation of the second set of optical fibers.

3. The system of claim 1, wherein the fibrous mesh comprises a first set of optical fibers and a second set of optical fibers, the first set of optical fibers adjacent to the second set of optical fibers.

4. The system of claim 1, wherein the at least one optical fiber of the plurality of optical fibers is linear.

5. The system of claim 1, wherein the at least one optical fiber of the plurality of optical fibers is non-linear.

6. The system of claim 1, wherein the fibrous mesh is a woven fibrous mesh.

7. The system of claim 1, wherein the fibrous mesh is a nonwoven fibrous mesh.

8. The system of claim 1, wherein the fibrous mesh comprises a first set of optical fibers and a second set of optical fibers, the first set of optical fibers and the second set of optical fibers being in a bi-directional configuration.

9. A system comprising:
a glass structure through which light is configured to pass, wherein the glass structure comprises one or more glass panes; and
a plurality of optical fibers supported relative to at least one glass pane of the glass structure, the plurality of optical fibers configured to absorb and redirect light; the plurality of optical fibers comprising at least one cylindrical optical fiber and the at least one cylindrical optical fiber configured to absorb light radially.

10. The system of claim 9, wherein the plurality of optical fibers is positioned adjacent to at least one glass pane of the one or more glass panes.

11. The system of claim 9, wherein the plurality of optical fibers is positioned between two or more glass panes of the one or more glass panes.

12. The system of claim 9, wherein the plurality of optical fibers is affixed to at least one glass pane of the one or more glass panes.

13. The system of claim 9, wherein the plurality of optical fibers is adhered to at least one glass pane of the one or more glass panes.

* * * * *